United States Patent [19]

Cho et al.

[11] Patent Number: 4,961,085
[45] Date of Patent: Oct. 2, 1990

[54] LENS FITTED FILM PACKAGE

[75] Inventors: Michio Cho; Ko Aosaki; Tokuji Sato, all of Tokyo, Japan

[73] Assignee: Fuji Photo Film Co., Ltd., Kanagawa, Japan

[21] Appl. No.: 380,527

[22] Filed: Jul. 17, 1989

[30] Foreign Application Priority Data

| Jul. 15, 1988 | [JP] | Japan | 63-93787[U] |
| Jul. 18, 1988 | [JP] | Japan | 63-94711[U] |
| Jul. 18, 1988 | [JP] | Japan | 63-94712[U] |
| Aug. 5, 1988 | [JP] | Japan | 63-103930[U] |

[51] Int. Cl.$^5$ ............................................. G03B 11/00
[52] U.S. Cl. ..................................... 354/295; 354/288
[58] Field of Search ..................... 354/195.12, 288, 295

[56] References Cited

U.S. PATENT DOCUMENTS

| 2,926,577 | 3/1960 | Albrecht | 354/195.12 |
| 4,219,264 | 8/1980 | Rodeck | 354/295 X |
| 4,666,274 | 5/1987 | Maeno et al. | 354/295 X |
| 4,728,973 | 3/1988 | Taniguchi et al. | 354/295 X |

Primary Examiner—Brian W. Brown
Attorney, Agent, or Firm—Young & Thompson

[57] ABSTRACT

A lens-fitted film package comprising a light-tight case having at least a taking lens attached to a front wall thereof and a roll of film contained therein and a lens holder attached to the light-tight case. The lens holder is formed with a conversion lens holding opening for holding a conversion lens therein and a view-defining opening for defining the field of view of a viewfinder formed in the light-tight case. The lens holder is slidably moved with respect to the light-tight case so as to position the lens holder at a distance from the front wall of the light-tight case wherein the conversion lens changes the effective focal length of the taking lens and the view-defining opening defines the field of view of the viewfinder suitably for the effective focal length of the taking lens thus changed.

17 Claims, 16 Drawing Sheets

F I G. 9
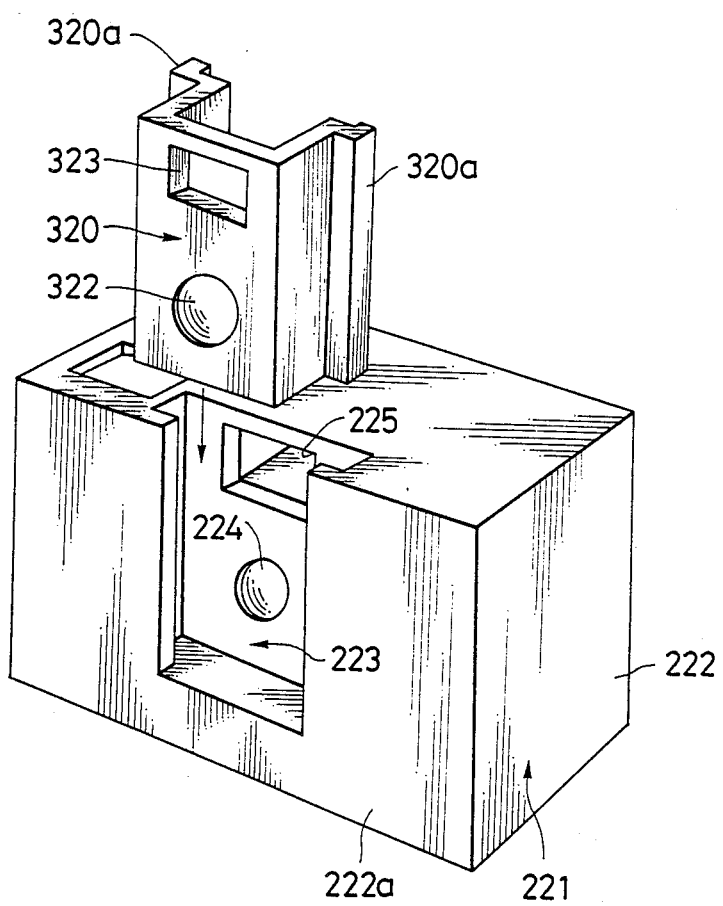

F I G. 16A
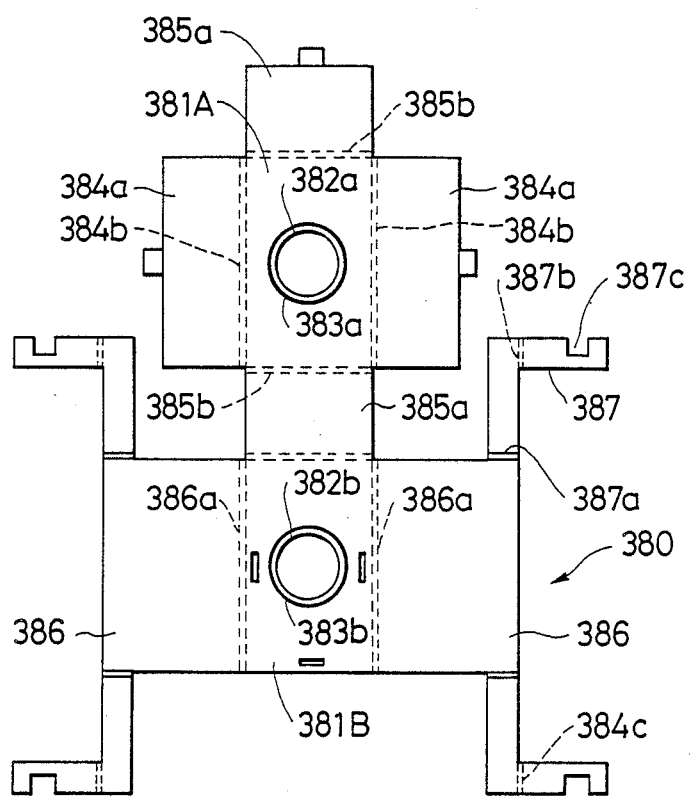
F I G. 16B
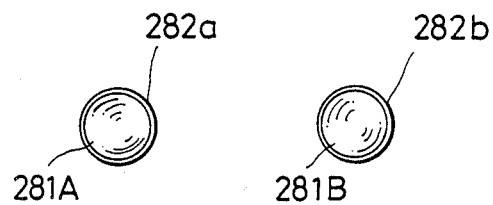

LENS FITTED FILM PACKAGE

BACKGROUND OF THE INVENTION

The present invention relates to a lens fitted film package, and more particularly to a lens fitted film package which is changeable as to its photographic magnification.

Lens fitted photographic film packages, which have become increasingly popular in recent years, have a patrone or cartridge containing a roll of film, a taking lens and a simple shutter structure which are packaged as a unit. For economy, such a lens fitted film package is provided with a single-element taking lens made of plastic and a viewfinder of simple construction such a direct-vision viewfinder. Such lens-fitted film packages provide photographers with trouble-free operation when taking pictures because there is no need to load and unload a film.

The lens-fitted film package, after the exposure of all frames of the film is forwarded to a photo shop or photo laboratory without removing the film. There, the exposed film in a film cartridge is removed by breaking open the film package and is then developed to make prints therefrom while the empty film package is scrapped. The prints together with the developed film are returned to the customer. The single-element taking lens of the lens-fitted film package, which usually has a focal length of about 35 mm, is suitable for standard or relatively wide-angle photography when the lens-fitted film package contains a 135-type roll film.

On the other hand, it is a recent tendency in conventional 35 mm compact cameras to employ a focal length changeable lens as the taking lens. Some of such focal length changeable lens include telephotographic conversion lenses which are moved into or out of the optical path of a taking lens having a focal length suitable for standard or relatively wide-angle photography. To move the conversion lens into and out of the optical path of the taking lens so as to change the focal length of the taking lens suitably for telephotography, it is necessary to incorporate a conversion lens moving mechanism in the 35 mm compact camera. Such a conversion lens moving mechanism is, however, too intricate, bulky and expensive to incorporate in the above-described lens-fitted film packages.

OBJECT OF THE INVENTION

It is, therefore, the primary object of the present invention to provide a lens-fitted film package in which a taking lens can be easily changed as to its focal length.

SUMMARY OF THE INVENTION

This object is achieved by providing a lens-fitted film package comprising a light-tight case having at least a taking lens attached to a front wall thereof and a roll of film contained therein and a lens holder attached to the light-tight case and formed with an opening for holding a conversion lens thereon. A positioning mechanism is disposed between the light-tight case and the lens holder for positioning the lens holder at a predetermined distance from and in alignment with the taking lens so as to place the conversion lens fitted in the opening in front of the taking lens, thereby changing the focal length of the taking lens suitably for telephotography or wide-angle photography.

In the lens-fitted film package according to a preferred embodiment of the present invention, the lens holder is further formed with a view angle defining opening not larger in size than the front view frame of a direct-vision viewfinder provided in the light-tight case. When the lens holder is positioned at the predetermined distance, the view angle defining opening of the lens holder is placed so as to change the view correspondingly for the focal length of the taking lens as changed by the conversion lens.

BRIEF DESCRIPTION OF THE DRAWINGS

The above and other objects and features of the present invention will be apparent from the following description of preferred embodiments when taken in conjunction with the appended drawings, in which:

FIG. 9 is a variant of the lens-fitted film package shown in FIG. 8, wherein a lens holder with a fixed conversion lens is adapted to be slid vertically into and out of the lens-fitted film package;

FIG. 16A is a uniplanar developed view of a variant of the foldable lens holder shown in FIG. 15A;

FIG. 16B is a plan view of the lenses of the two-element telephotographic conversion lens shown in FIG. 16A;

DETAILED DESCRIPTION OF THE INVENTION

The lens-fitted film package according to preferred embodiments of the present invention incorporates several elements, in particular exposure elements and film advancing elements, similar to those of simple still picture cameras. Because such elements are well known to those having ordinary skill in the art, this description will be directed in particular to elements forming part of, or cooperating directly with the lens-fitted film package embodying the present invention. It is to be noted that, although the description will be directed to the lens-fitted film package incorporating a 35 mm-size film patrone or cartridge as a light-tight film container, the film container may take any of various forms well known to those skilled in the art and already commercially available. It is to be noted that the lens-fitted film package may incorporate a film winding and rewinding mechanism by which a film contained in a film cartridge is advanced by one frame every exposure and, when the exposure of all frames of the film is completed, the exposed film is rewound in the film container.

Figure 1:
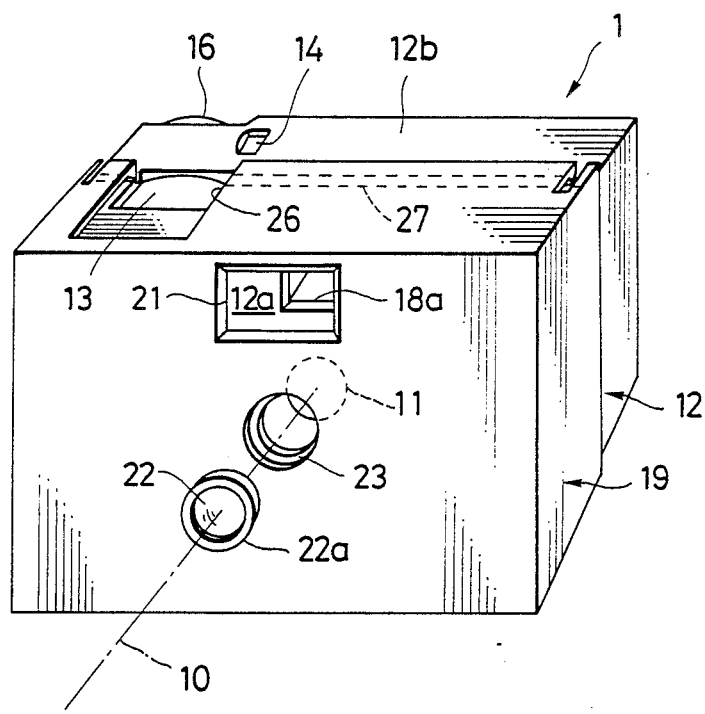
FIG. 1 is a schematic perspective view showing a lens-fitted film package in accordance with a preferred embodiment of the present invention provided with a telephotographic conversion lens detachably fitted to a rectangular box-shaped lens holder.
Figure 2:
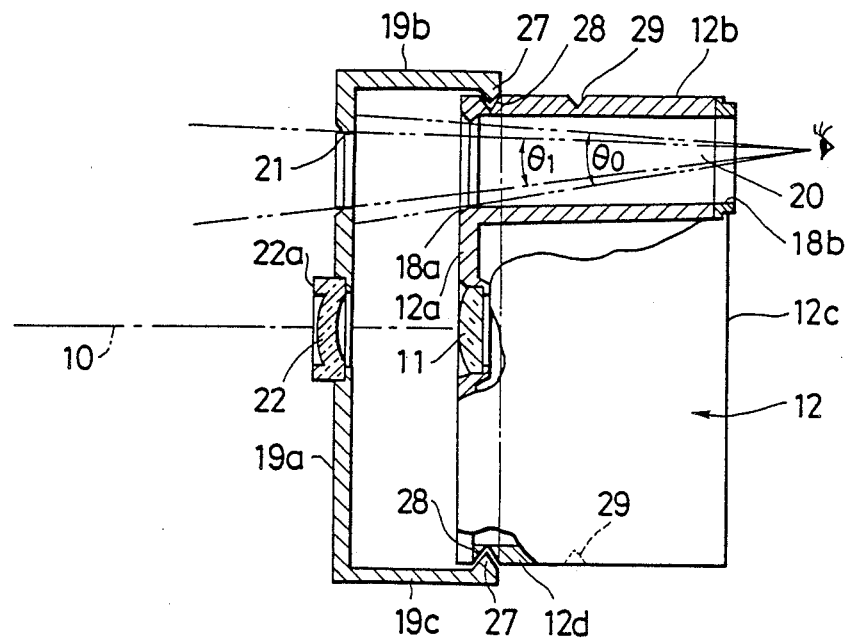
FIG. 2 is a cross-sectional view of the lens-fitted film package shown in FIG. 1, in which the rectangular box-shaped lens holder is moved forwardly.
Figure 3:
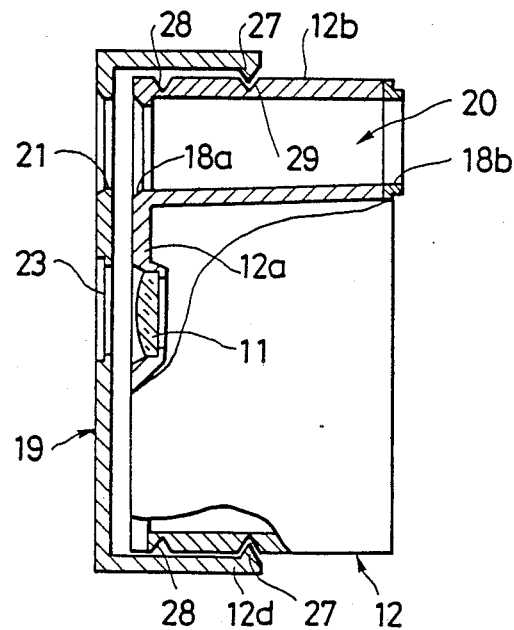
FIG. 3 is a cross-sectional view of the lens-fitted film package shown in FIG. 1, in which the rectangular box-shaped lens holder is moved rearwardly.

Referring to the drawings, in particular to FIGS. 1 to 3, a lens-fitted film package (which is hereinafter referred simply to as a film package) in accordance with a preferred embodiment of the present invention is shown, having a light-tight rectangular box-shaped film housing or case 12. The case 12 is provided with a single-element taking lens 11 having an optical axis 10, lens 10 being attached to a front wall 12a of case 12, a shutter actuating member 13 and a window 14 through which an exposure counter is viewed in an upper wall 12b thereof, and a film winding knob 16 in a rear wall 12c thereof. The front wall 12a of the case 12 is formed with a front opening 18a forming a front view frame of a direct-vision viewfinder 20. The rear wall 12c of the case 12 is formed with a rear opening 18b, smaller in size than the front opening 18a, forming a rear view frame of the direct-vision viewfinder 20. The case 12 is formed with front and rear click grooves 28 and 29 in the outer surface of each of the upper and lower walls 12b and 12d thereof. These click grooves 28 and 29 extend from side to side of each of the upper and lower walls 12b and 12d and are perpendicular to the optical axis 10 of the taking lens 11.

A lens holder 19 which is of generally rectangular box-shape is slidably fitted on the case 12 so as to slide back and forth. The box-shaped lens holder 19 covers and protects the front wall 17 of the case 12. The lens holder 19 is formed with an opening 21 which is substantially the same in size as and in alignment with the front opening 18a of the front wall 12a. When the lens holder 19 is slid forward to space apart the opening 21 of the lens holder 19 from the front opening 18a of the front wall 12a, the front opening 18a effectively functions as a front view frame of the direct-vision viewfinder 20 so as to decrease the field of view of the direct-vision viewfinder 20. The lens holder 19 is formed with an opening 23 in a front wall 19a for detachably mounting a single-element telephotographic front conversion lens 22 with an integral flange 22a. When the front conversion lens 22 is mounted on the lens holder 19, it is coaxially aligned with the taking lens 11. The lens holder 19 is provided with click projections 27 which are formed integrally with rear edges of the upper and lower walls 19b and 19c thereof and extend from side to side thereof. The ends of each click projection 27 are spaced from the ends of the adjacent side walls of the lens holder 19 so as to be slightly bendable. The click projections 27 are engaged in the rear click grooves 28 when the lens holder 19 is slid rearward, i.e. retracted, or in the front click grooves 29 when the lens holder 19 is slid forward. The lens holder 19 is formed with a cut out 26 for exposing the shutter actuating member 18 in either the extended or the retracted position of lens holder 19.

When retracting or sliding rearward the lens holder 19 as shown in FIG. 3, the click projections 27 are engaged with the rear click grooves 29 to hold the lens holder 19 close to the front wall 12a of the case 12. The taking lens 11 receives light defined by the opening 23. This is suitable for standard photography. For telephotography, the lens holder 19 is extended or slid forward until the click projections 27 engage with the front click grooves 28 so as to place the lens holder 19 farther from the front wall 12a of the case 12 as shown in FIG. 2. The front conversion lens 22, which may be secured in the lens mounting opening 23 either before or after the extension of the lens holder 19, is held in a proper position with respect to the taking lens 11, thereby forming a telephotographic lens system. At this time, the opening 21 is located far from the front opening 18a of the direct-vision viewfinder 20 so as to decrease the angle of view of the direct-vision viewfinder 20 from $\theta_0$ to $\theta_1$, thereby making the lens-fitted film package 1 suitable for telephotography.

Figure 4:
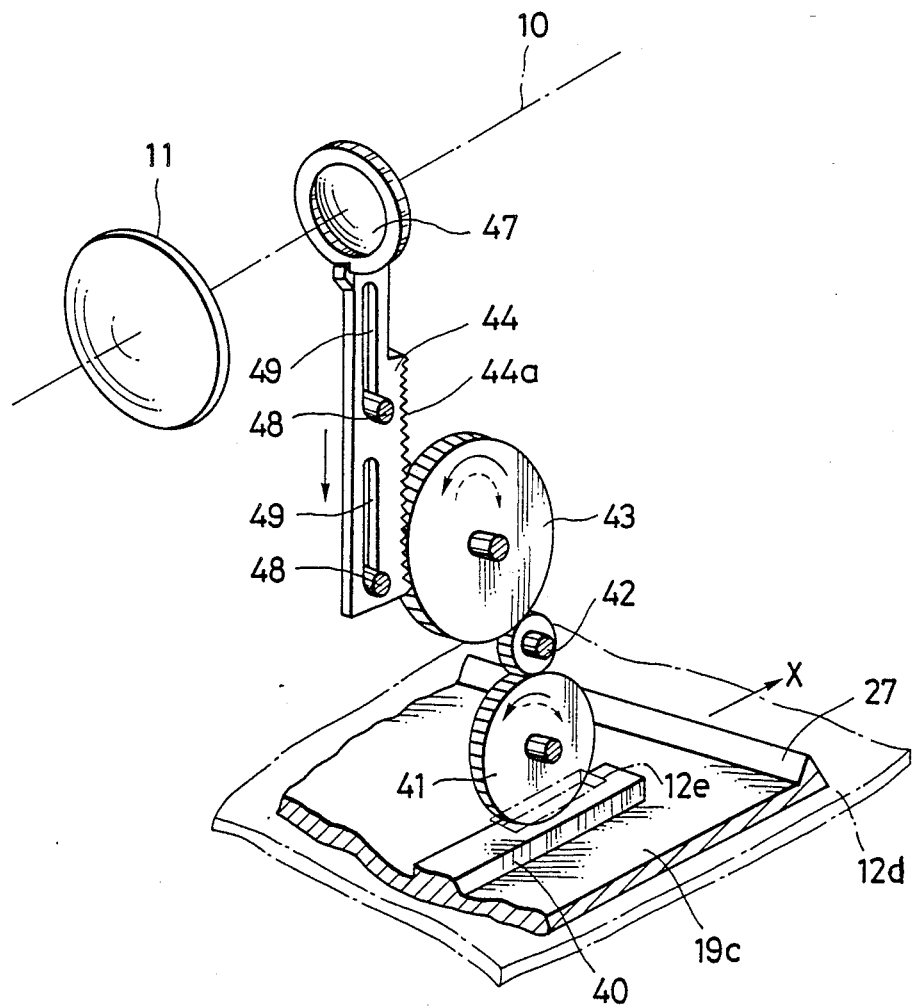
FIG. 4 is a schematic perspective view showing a conversion lens moving mechanism incorporated in a lens-fitted film package in accordance with another preferred embodiment of the present invention.

In place of the telephotographic front conversion lens 22 which is manually mounted on and removed from the lens-fitted film package 1, it may be advantageous to incorporate a telephotographic rear conversion lens in the film package 1. As shown in FIG. 4, a single-element telephotographic rear conversion lens 47 is fixed to a slidable arm 44 provided with an integral rack 44a formed on a rear edge thereof. The slidable arm 44 extends vertically and is formed with two guide slots 49 which receive guide pins 48 secured to the case 12 for guiding up and down sliding movement of the slidable arm 44. A pinion 43 secured to the case 12 is in the mesh with the rack 44a and an idle gear 42 secured to the case 12. A pinion gear 41 secured to the case 12 and in mesh with the idle gear 42 partly extends outside the case 12 through an opening 12e formed in the lower wall 12d of the case 12. The pinion gear 41 is in mesh with a rack 40 which extends in a direction parallel to the optical axis 10 of the taking lens 11 and is either formed integrally with or secured to the lower wall 19c of the lens holder 19.

When the lens holder 19 is slid forward to engage the click projections 27 with the front click grooves 28, the pinion gears 41 and 43 are turned in a direction shown by a dotted arrow in FIG. 4, shifting up the slidable arm 44 so as to place the rear conversion lens 47 in alignment with the taking lens 11, whereby forming the telephotographic lens system.

On the other hand, when sliding the lens holder 19 close to the front wall 19a of the case to engage the click projections 27 with the rear click grooves 29 in a direction X, the pinion gears 41 and 43 are turned in a direction shown by a solid arrow in FIG. 4, shifting down the slidable arm 44 so as to remove the rear conversion lens 47 out of alignment with the optical axis 10 of the taking lens 11. This brings the lens-fitted film package 1 into a condition suitable for standard photography.

Figure 5:
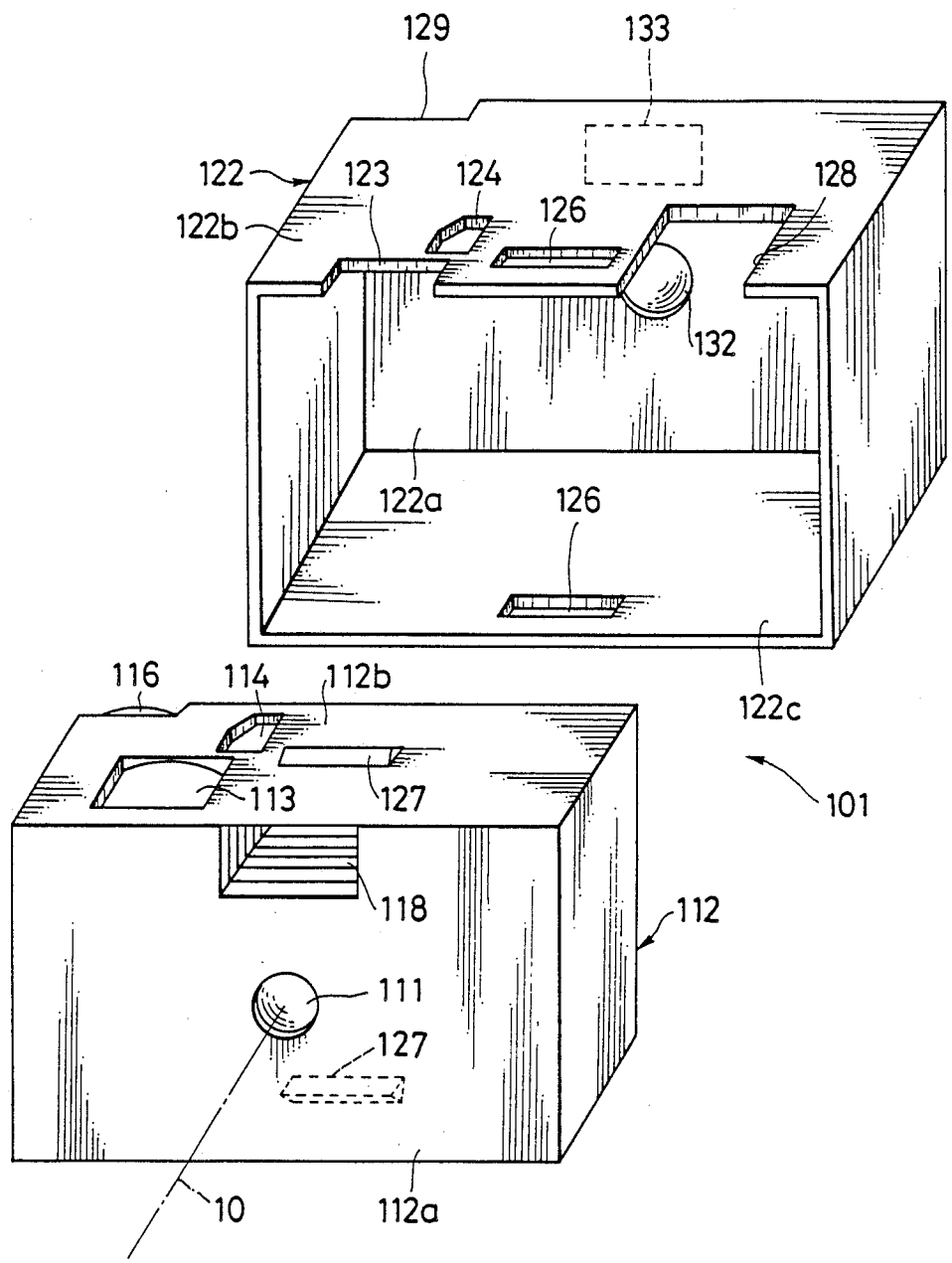
FIG. 5 is an exploded perspective view showing a lens-fitted film package in accordance with still another preferred embodiment of the present invention provided with a telephotographic conversion lens fixedly fitted to a rectangular box-shaped lens holder.
Figure 6:
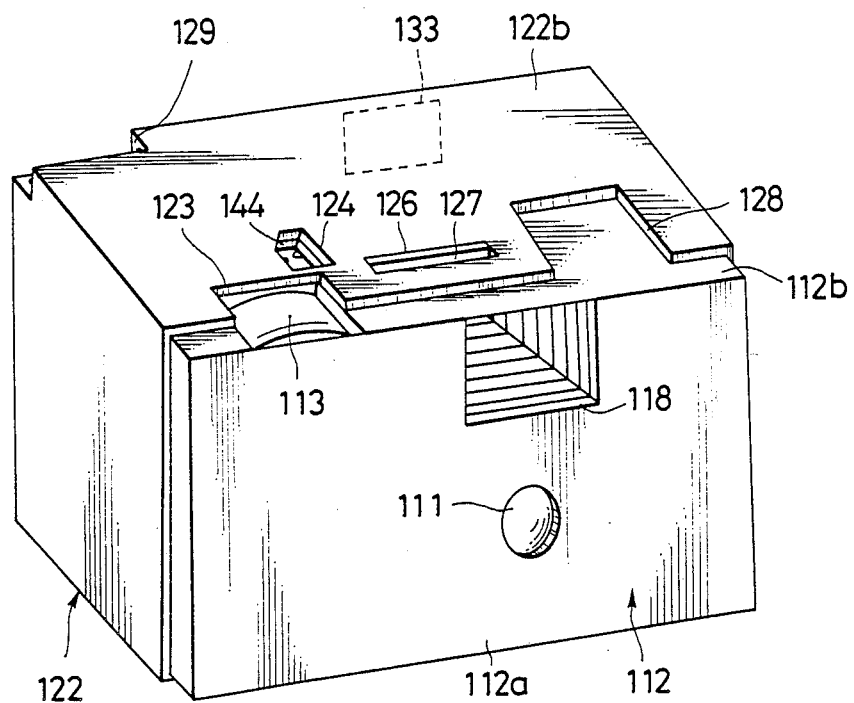
FIG. 6 is a perspective view of the lens-fitted film package shown in FIG. 5, in which the rectangular box-shaped lens holder is in its storage or non-use position, in which it is fitted on the back of the lens-fitted film package.
Figure 7:
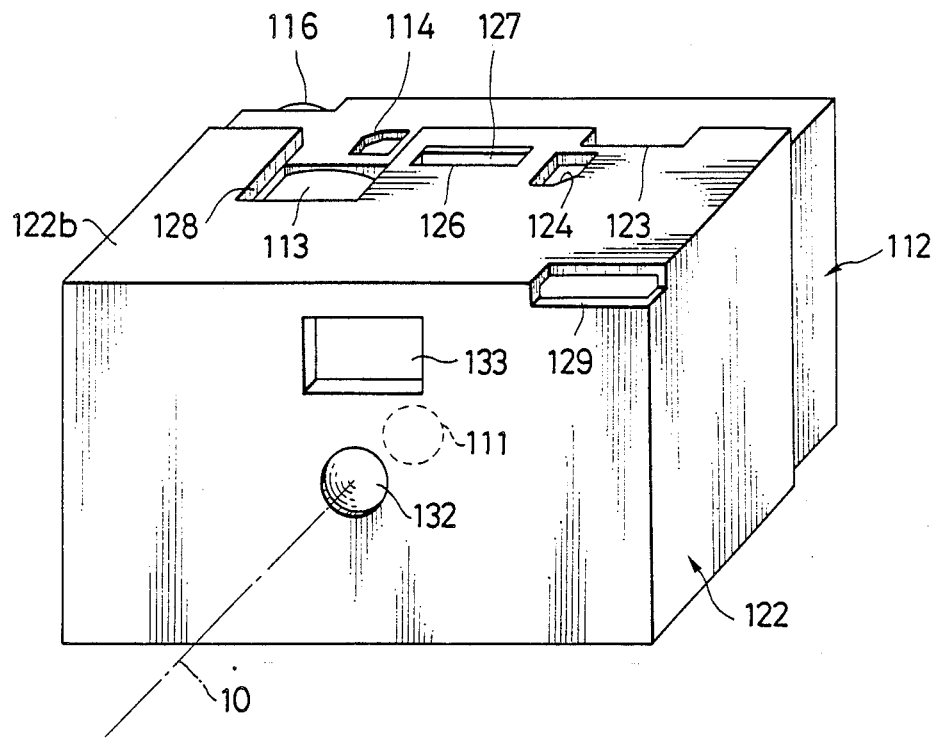
FIG. 7 is a perspective view of the lens-fitted film package shown in FIG. 5, in which the rectangular box-shaped lens holder is in its use position, in which it is fitted on the front of the lens-fitted film package.

Referring to FIGS. 5 to 7, a lens-fitted film package 101 in accordance with still another preferred embodiment of the present invention is shown, having a light-tight rectangular box-shaped film housing or case 112. The case 112 is provided with a single-element taking lens 111 having an optical axis 10 attached to a front wall 112a thereof, a shutter actuating member 113 and window 114 through which an exposure counter is viewed in an upper wall 112b thereof, and a film winding knob 116 in a rear wall (which is hidden in FIGS. 5 to 7) thereof. The front wall 112a of the case 112 is formed with a front opening 118 forming a front view frame of a direct-vision viewfinder. The rear wall of the case 112 is formed with a rear opening (which is hidden in FIGS. 5 to 7) forming a rear view frame of the direct-vision viewfinder. The case 112 is formed with upper and lower click projections 127 in the outer surfaces of the upper and lower walls 112b and 112d thereof. These upper and lower click projections 127 extend perpendicularly to the optical axis 10 of the taking lens 111.

A lens holder 122, formed in a generally rectangular box-shape, is fittable onto the case 112 either from the front or from the rear. The box-shaped lens holder 122 is formed with an opening 133 in a front wall 122a which is substantially the same in size as, and in alignment with, the front opening 118 of the front wall 112a of the case 112. When the lens holder 122 is fitted onto the front of the case 112 (FIG. 7) to place the opening 133 of the lens holder 122 spaced forwardly from the front opening 118 of the front wall 112a of the case 112, the front opening 133 effectively functions as a front view frame of the direct-vision viewfinder so as to decrease the field of view of the direct-vision viewfinder.

The lens holder 122 is provided with a single-element telephotographic front conversion lens 132 in the front wall 122a thereof. When the lens holder 122 is fitted onto the case 112 from the front, the front conversion lens 132 is coaxially aligned with the taking lens 111.

The lens holder 122 is -provided with upper and lower click openings 126 which extend perpendicularly to the optical axis 10 of the taking lens 111 and cause those portions of the upper and lower walls 122b and 122c of the lens holder 122 which border the click openings 126 to be The click openings 126 receive the click projections bendable. The click openings 126 receive the click projections 127 of the case 112 when the lens holder 122 is fitted onto either the front or the rear of case 112. The lens holder 122 is formed in the upper wall 122b with a cut-out 123 and an opening 124, similar to the opening 114 of the case 112, for exposing the shutter actuating member 113 and the exposure counter, respectively, when the lens holder 122 is fitted onto the case 112 from the rear (FIG. 6). The lens holder 122 is further formed in its upper wall 122b with a cut-out 128 and an opening 129 for exposing the shutter actuating member 113 and the exposure counter and the film winding knob 116, respectively, when the lens holder 122 is fitted onto the case 112 from the front (FIG. 7).

When the lens holder 122 is fitted onto the case 112 from the rear of the case 112, as shown in FIG. 6, the middle portions of the upper and lower walls 122b and 122c of the lens holder 122 are slightly ben so as to ride over the upper and lower click projections 127 of the upper and lower walls 112b and 112c of the case 112, causing the upper and lower click openings 126 to receive the upper and lower click projections 127 with a snap action. Due to the engagement between the click openings and the click projections, the lens holder 122 is fixedly positioned so that the opening 133 defines the field of view of the direct-vision viewfinder appropriately for standard photography in cooperation with the front opening 118 and the openings 123 and 124 expose the shutter actuating member 113 and the exposure counter, respectively. Accordingly, the lens-fitted film package 101 can be used suitably for standard photography.

For telephotography, the lens holder 122 is detached from the case 112 and the fitted again onto the case 112 but from the front of the case 112 a shown in FIG. 7. In a similar manner, the upper and lower click openings 126 of the lens holder 122 are caused to receive the upper and lower click projections 127 of the case 122 with a snap action so as to fixedly position the lens holder 122, thereby placing the front conversion lens 132 in front of and in alignment with the taking lens 111 with a distance therebetween that is suitable for telephotography. As a result, the taking lens 111 and the conversion lens 132 form a telephotographic lens system. Simultaneously, the opening 133 is also so disposed in front of the front opening 118 of the direct-vision viewfinder of the case 112 with an appropriate distance therebetween as to decrease the field of view of the direct-vision view finder appropriately for the telephotographic lens system thus formed.

Figure 8:
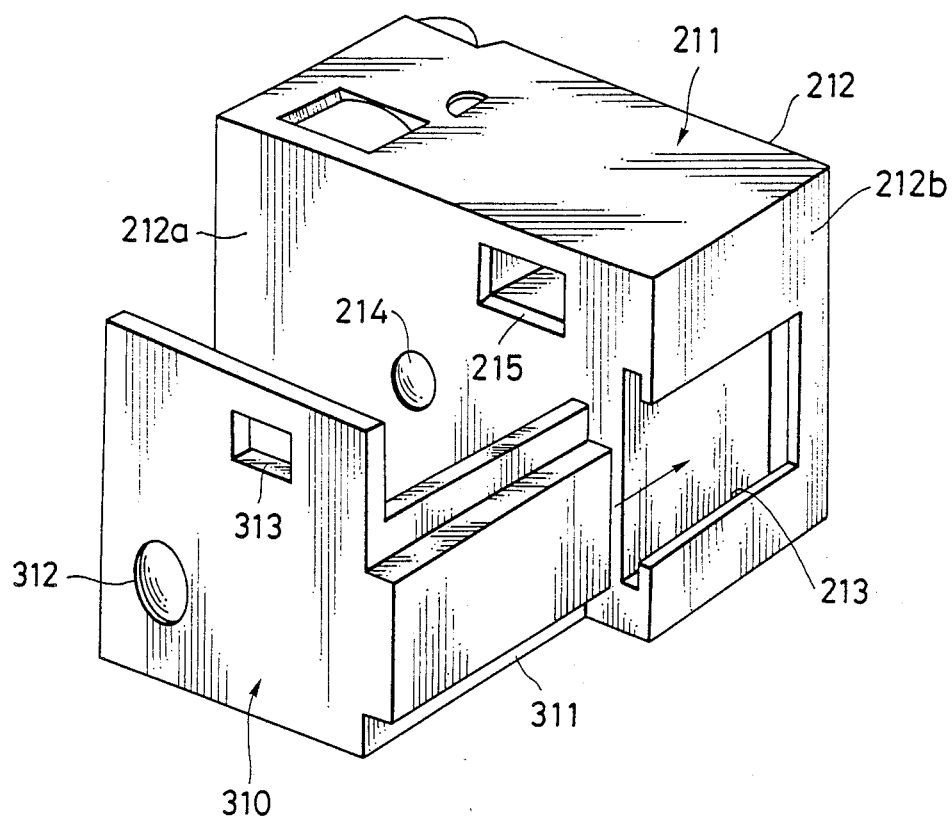
FIG. 8 is an exploded perspective view of a lens-fitted film package in accordance with yet another embodiment of the present invention in which a board-shaped lens holder with a fixed conversion lens is detachable from the lens-fitted film package.

Referring to FIGS. 8 to 13, various types of plate-like lens holders cooperating with lens-fitted film packages are shown. A plate-like lens holder 310 is shown in FIG. 8, which is provided for use with a lens-fitted film package 211 comprising a generally-rectangular box-shaped light-tight case 212 having a shoe clip in the form of a bayonet slot 213 formed in a side wall 212b of the case 212 for receiving a connecting shoe of a flash unit. The lens holder 310 has a side connecting shoe 311 formed integrally with and extending perpendicular to the lens holder 310. The lens holder 310 holds, either fixedly or detachably, a telephotographic front conversion lens 312 and is formed with an opening 313.

When the lens holder 310 is attached to the case 212 by completely seating the connecting shoe 311 in the bayonet slot 213, the lens holder 310 is so disposed in front of the case 212 with a suitable distance therebetween as to align the conversion lens 312 with a taking lens 214 held in a front wall 212a of the case 212, thereby forming a telephotographic lens system. Simultaneously, the opening 313 is also so disposed in front of a front opening 215 formed as a front view frame of a finder in the front wall 212a of the case 212 with a suitable distance therebetween as to decrease the field of view of the viewfinder appropriately for the telephotographic lens system thus formed.

FIG. 9 shows another type of a plate-like lens holder 320 which is formed as a generally U-shaped connecting shoe having side rails 320a. A lens-fitted film package 221, for use with the connecting shoe-type lens holder 320, has a generally rectangular box-shaped light-tight case 222 formed with a vertical shoe clip in the form of a bayonet slot 223 in a front wall 222a thereof. The case 222 has a taking lens 224 and a front view frame opening 125 of a finder attached to or formed in the front wall 22a of the case 222 within the bayonet slot 223. The lens holder 320 holds, either fixedly or detachably, a telephotographic front conversion lens 322 and is formed with an opening 323 above the telephotographic front conversion lens 322.

When the lens holder 320 is attached to the case 222 by fully sliding the side rails 320a down into the bayonet slot 223, the lens holder 310 is so disposed in the shoe clip 223 of the front wall 222a of the case as to align the conversion lens 322 with the taking lens 224 with a suitable distance therebetween, thereby forming a telephotographic lens system. Simultaneously, the opening 323 is also so disposed in front of the front view opening 225 of the viewfinder with a suitable distance therebetween as to decrease the field of view of the viewfinder appropriately for the telephotographic lens system thus formed.

Figure 10:
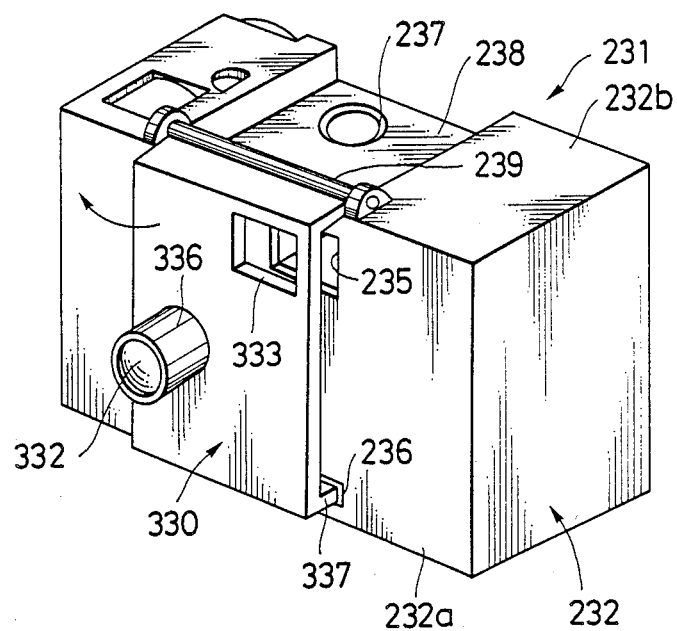
FIG. 10 is still another variant of the lens-fitted film package shown in FIG. 8, wherein a lens holder with a fixed conversion lens is vertically swingable toward and away from the lens-fitted film package.

FIG. 10 shows still another type of a plate-like lens holder 330 which is supported for vertical swinging movement by a shaft 239 supported by a generally rectangular box-shaped light-tight case 232 of a lens-fitted film package 231. The lens holder 330 holds, either fixedly or detachably, a cylindrical lens barrel 336 incorporating therein a telephotographic front conversion lens 332 and is formed with an opening 333 above the lens barrel 336. The lens holder 330 is integrally formed with a lower collar 337.

The case 232 is formed with a relatively deep recess 238 extending parallel to the optical axis in a top wall 232b thereof for snugly receiving the lens holder 330 when the lens holder is swung up through about 270° about the shaft 239. The case 232 is further formed with a hole 237 in the top wall 232b within the recess 238 and a slot 236 in a front wall 232a thereof. The case 222 has a taking lens (hidden behind the lens holder 330) and a front view frame opening 225 of a finder attached to or formed in the front wall 232a thereof.

When the lens holder 330 is fully swung down as shown in FIG. 10, it is so disposed in front of the front wall 232a of the case 232 and the lower collar 237 of the lens holder 330 is received in the slot 236 of the case 232 as to align the conversion lens 332 with the taking lens with a suitable distance therebetween, thereby forming a telephotographic lens system. Simultaneously, the opening 333 is also so disposed in front of the front view opening 235 of the viewfinder with a suitable distance therebetween as to decrease the field of view of the view finder appropriately for the telephotographic lens system thus formed.

For standard photography, the lens holder 330 is swung up in a direction shown by an arrow in FIG. 10 so as to expose the taking lens and the front view frame 235 of the viewfinder. As the lens barrel 336 is fully turned about the shaft 239, the lens barrel 336 is received in the hole 237 formed within the recess 238 and the lens holder 330 is snugly seated or received within the recess 238.

Figure 11:
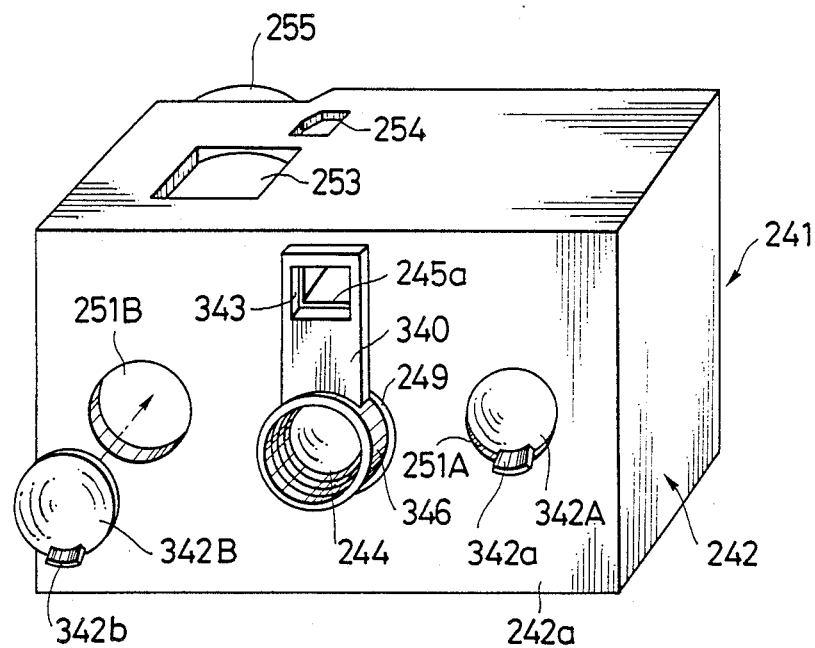
FIG. 11 is a perspective view showing a lens-fitted film package in accordance with a further preferred embodiment of the present invention provided with a slidable lens holder having a telephotographic conversion lens detachably fitted thereto.
Figure 12:
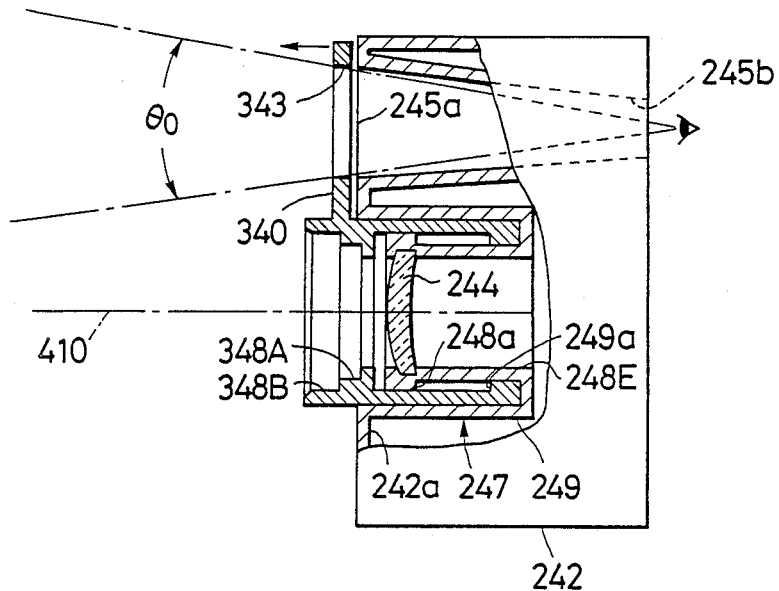
FIG. 12 is a cross-sectional view of the lens-fitted film package shown in FIG. 11, in which the slidable lens holder is moved rearwardly.
Figure 13:
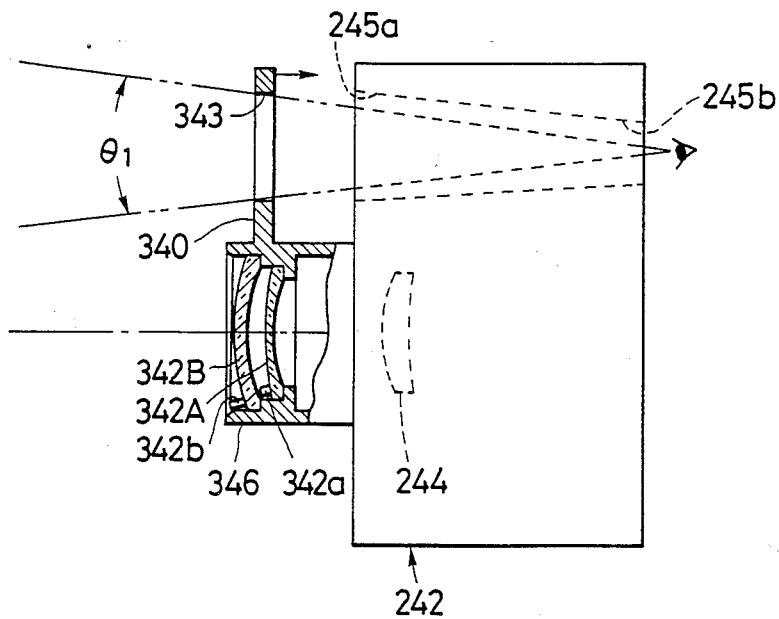
FIG. 13 is a cross-sectional view of the lens-fitted film package shown in FIG. 11, in which the slidable lens holder is moved forwardly.

FIGS. 11 to 13 show yet another type of a plate-like lens holder 340 slidably mounted in a lens-fitted film package 241. The lens-fitted film package 241 has a generally rectangular box-shaped light-tight case 242 formed with front and rear view frame openings 245a and 245b which form a direct-vision viewfinder having an angle of view $\theta_0$ for standard photography. The case 242 is formed with a mounting opening 249 in a front wall 242a thereof for slidably mounting the lens holder 340 for axial movement.

The lens holder 340 is formed with a finder frame opening 343 no larger in size than the front view frame opening 245a and an integral lens barrel 346 extending rearward from the lens holder 340 below the finder frame opening 343 for detachably mounting telephotographic front conversion lens elements, namely concave and convex single-element lenses 342A and 342B. The lens barrel 346 is internally formed with mounting openings 348A and 348B having different inner diameters in which the front conversion lenses 342A and 342B are fitted, respectively.

The case 242 is formed with a double-walled cylindrical mounting 247 comprising inner and outer cylindrical walls 248 and 249. The inner cylindrical wall 248 fixedly mounts a taking lens 244 having a focal length suitable for standard photography. A space is provided between the inner and outer cylindrical walls 248 and 249 and slidably receives the lens barrel 346. The inner cylindrical wall 248 is formed with an outer peripheral flange 248a engageable with an inner peripheral flange 249a integrally formed on the rear end of the lens barrel 346 so as to limit the forward movement of the lens barrel 346.

The case 242 is further formed with circular recesses 251A and 252B in the front wall 242a thereof in which the conversion lenses 342A and 342B are detachably fitted. Each conversion lens 342A, 342B is preferably made of plastic and is integrally formed with a tab 342a, 342b. Designated by reference numerals 253, 254 and 255 are a shutter actuating member, an opening through which an exposure counter is viewed and a film winding knob, respectively.

The lens-fitted film package 241 in the position shown in FIGS. 11 and 12 is suitable for standard photography. That is, the lens barrel 346 of the lens holder 340 is fully slid to the rear within the cylindrical lens mounting 247, thereby positioning the lens holder 340 close to the front wall 242a of the case 242. Because none of the conversion lenses 342A and 342B is attached to the lens holder 340 and only the taking lens 244 is in the optical path 10, the lens-fitted film package is ready for standard photography. At this time, the angle of view of the viewfinder is defined as $\theta_0$ by the finder frame opening 343 formed in the lens holder 340 and the rear view opening 245b of the case 242.

For telephotography, the concave conversion lens element 342A is removed from the recess 251A by pulling on the tab 342a of the concave conversion lens element 342A with the fingers and is fitted into the mounting opening 348A of the lens barrel 346. In a similar manner, the convex conversion lens element 342B is fitted into the mounting opening 348B of the lens barrel 346. Thereafter, the lens holder 346 is fully slid forward so as to place the conversion lens elements 348A and 348B at a predetermined distance from the taking lens 244 as shown in FIG. 13, thereby forming a telephotographic lens system aligned along the optical path 10. At this time, the viewfinder has an angle of view $\theta_1$ defined by the finder frame opening 343 of the lens holder 340 spaced from the front view opening 245a of the case 242 and the rear view opening 245b of the case 242, which is smaller than the angle of view $\theta_0$ and suitable for the telephotographic lens system thus formed.

Figure 14:
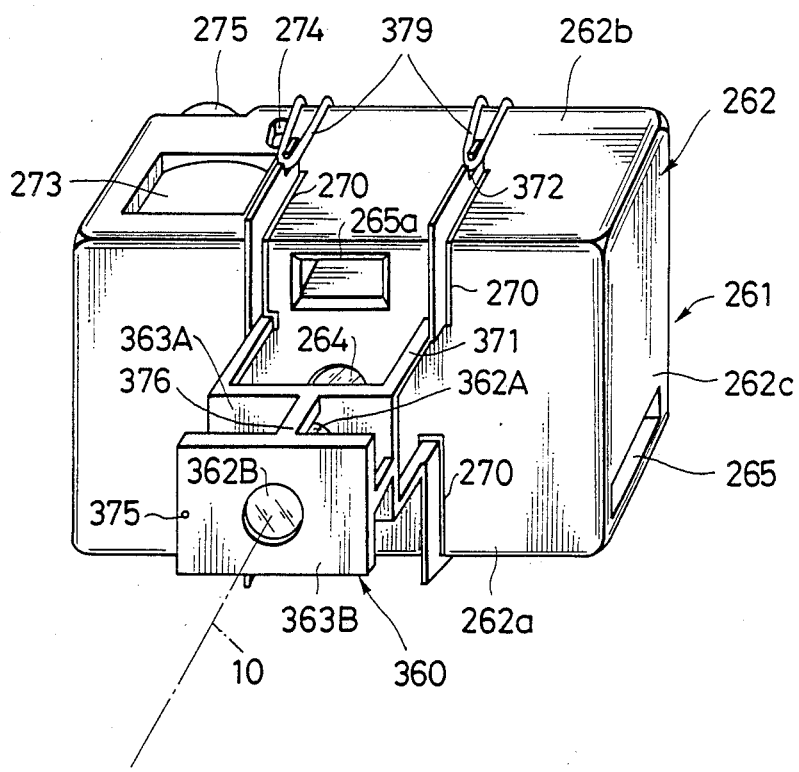
FIG. 14 is a perspective view of a lens-fitted film package in accordance with a still further preferred embodiment of the present invention provided with a foldable lens holder having a two-element telephotographic conversion lens fitted thereto.

Referring to FIGS. 14 to 18B, various types of foldable lens holders cooperating with lens-fitted film packages are shown. Referring to FIGS. 14, 15A and 15B, a lens-fitted film package 261 in accordance with another preferred embodiment of the present invention is shown, having a generally rectangular box-shaped light-tight case 262. The case 262 is provided with a single-element taking lens 264 having an optical axis 10, attached to a front wall 262a thereof, a shutter actuating member 273 and a window 274 through which an exposure counter is viewed in an upper wall 262b thereof, and a film winding knob 275 in a rear wall thereof (which is hidden in FIG. 14). The front wall 262a of the case 262 is formed with a front view frame 265a forming a direct=vision viewfinder in cooperation with a rear view frame (which is hidden in FIG. 14), smaller than the front view frame 265a, formed in the rear wall (which is hidden in FIG. 14) of the case 262.

Figure 15A:
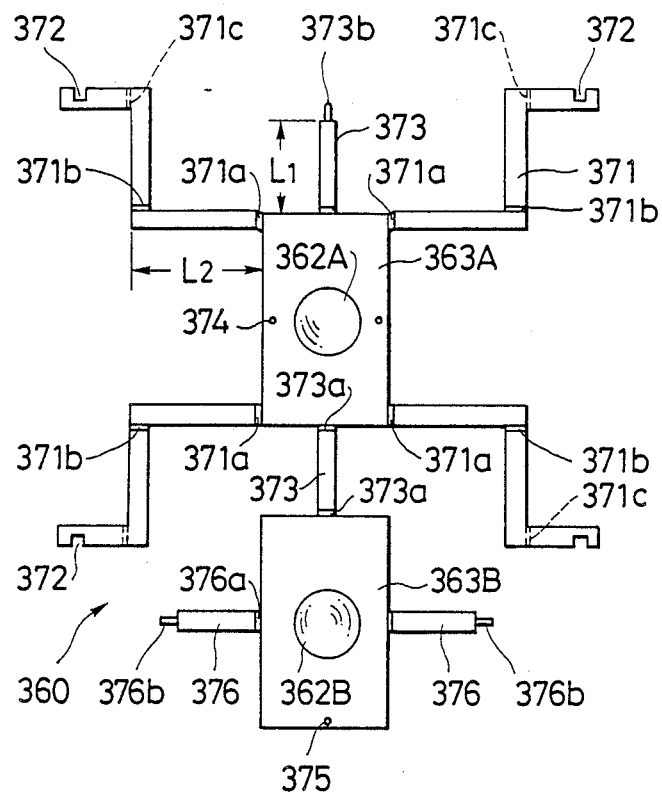
FIG. 15A is a uniplanar developed view of the foldable lens holder shown in FIG. 14.
Figure 15B:
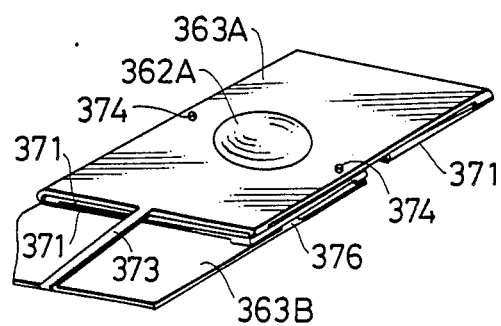
FIG. 15B is a perspective view of the foldable lens holder shown in FIG. 14 in folded condition.

The case 262 is formed with parallel mounting grooves 270 extending from the front wall 262a to the upper wall 262b or to the lower wall (which is hidden in FIG. 14) for mounting a foldable conversion lens holder 360 holding a two-element conversion lens system which is shown in FIG. 15A and will be described in detail later. The case 262 is provided with a pocket 265 formed in a side wall 262c near the lower end thereof. The pocket 265 receives therein the lens holder 360 folded as shown in FIG. 15B.

The lens holder 360, which is shown in detail as developed or unfolded in FIG. 15A, is made of plastic as an integral unit and holds a telephotographic front conversion lens system consisting of two lens elements: front and rear conversion lens elements 362A and 362B. The lens holder 119 comprises front and rear lens boards 363A and 363B, respectively, having the front and rear conversion lens elements 362A and 362B either integrally formed therewith or fitted therein.

The rear lens board 363A is provided with four crank-shaped struts 371 foldable along grooved folding lines 371a, 371b and 371c at upper and lower sides thereof. Each crank-shaped strut 371 is formed with a notch 372 near its free end. The rear lens board 363A is further provided with end struts 373 foldable along grooved folding lines 373a extending on both ends. One of the end struts 373 is formed with a pin-like projection 373b. The rear lens board 363A is further formed with small holes 374 along both sides thereof for receiving and firmly grasping the pin-like projections 376b of side struts 376 of the front lens board 363B when the lens holder 119 is erected and assembled.

The front lens board 363B is connected to one end of the rear lens board 363A by means of the other of the end struts 373. The front lens board 363B has side struts 376. Each side strut 376 is formed with a grooved folding line 376a adjacent to the front lens board 363B and a pin-like projection 376b at its free end. The front lens board 363B is further formed with a small hole 375 at one end thereof for receiving and firmly grasping the pin-like projection 373b of the end strut 373 when the lens holder 360 is erected and assembled. The end struts 373 have a length L1 so as to space the front and rear conversion element lenses 362B and 362A apart from each other a distance L1 when the lens holder 360 is erected and assembled. The stems of the crank-shaped struts 371 have a length L2 so as to space the rear conversion element lens 362A and the taking lens 264 apart from each other a distance L2 when the lens holder 360 is attached to the case 262.

The lens holder 360 is erected by first folding back the stems of the crank-shaped struts 127 along the grooved folding lines 371a at a right angle and folding up the L-shaped arms along the grooved folding lines 371b at a right angle. Then the side struts 376 and the end struts 373 are folded up along the grooved folding lines 376a and 373a at a right angle. Thereafter the front lens board 363B is turned over by folding the connecting end strut 373 along the grooved folding line 373a at a right angle and the small holes 374 and 375 of the lens boards 363A and 363B are made to receive the pin-like projections 376b and 373b of the struts 376 and 373, respectively.

The lens holder 375 thus erected and assembled is attached to the case 262 by fitting the edges of the L-shaped arms of the crank-shaped struts 371 into the mounting grooves 270 of the case 262. Thereafter, rubber bands 379 are stretched between the notches 128 so as firmly to mount the erected and assembled lens holder 360 on the case 262, thereby to position the two-element conversion lens system consisting of the front and rear lenses 362B and 362A with a distance L1 therebetween and a distance L2 between the rear lens 362A and the taking lens 264. In such a manner, the lens-fitted film package 261 is made ready for telephotography.

The lens-fitted film package 261 can be brought into readiness for standard or wide-angle photography by detaching the lens holder 360 from the case 262 at any desired time.

For convenience of carrying, the lens holder 360 can be folded in a simple form as shown in FIG. 15B. After folding back the L-shaped arms of the side struts 371 along the grooved folding lines 371b at a right angle, the stems of the side struts 371 of the lens holder 360 detached from the case 262 are further folded along the grooved folding lines 371a at a right angle and stacked one upon another and the rear surface of the rear lens board 363A. Then the L-shaped arms of the side stems 371 are further folded back along the grooved folding lines 371b at a right angle so as to lie against the rear surface of the rear lens board 363A and the notched arm portions of the L-shaped arms of the side struts 371 are folded along the grooved folding lines 371c at an angle of about 180° so as to lie against the rear surface of the rear lens board 363A. After folding the end struts 373 against the rear surface of the rear lens board 363A and the side struts 376 against the rear surface of the front lens board 363B, the connecting end strut 373 is folded so as to lie against and between the front lens board 363B and the rear lens board 363A. The lens holder 360 thus folded has the simple and compact configuration shown in FIG. 15B, and is received in the pocket 265 formed in the side of the case 262.

If in fact the foldable lens holder 360 is integrally formed with the conversion lens elements 362A and 362B, it would have to be made of transparent acrylic resin, which is expensive. To avoid this expense, a separate-type foldable lens holder 380 such as is shown in FIG. 16A can be used. The lens holder 380, which is made of plastic material as an integral unit, comprises front and rear lens boards 381A and 381B formed with lens mounting openings 382a and 382b formed with inner circular seating shoulders or steps 383a and 383b, respectively.

The front lens board 381A has side boards 384a foldable along grooved folding lines 384b and an end board 385a foldable along a grooved folding line 385b. The rear lens board 381B has side boards 386 foldable along grooved folding lines 386a. Each side board 386 is formed with two L-shaped struts 387 foldable along grooved folding lines 387a and 387b. The free end of each L-shaped strut 387 is formed with a notch 387c. The front and rear lens boards 381A and 381B are connected to each other by means of one of the end boards 385a.

Two lens elements, namely, a concave lens 281A and a convex lens 281B, forming a telephotographic conversion lens are preferably made of plastic material, such as acrylic resin. The lenses 281A, 281B are integrally formed with a mounting flange 282a, 282b. The flanges 282a and 282b of the lenses 281A and 281B are tightly fitted in the seating shoulders 383a and 383b of the lens mounting openings 382a 281B on the lens holder 380. The lens holder 380 can be erected and assembled and attached to the case of the lens-fitted film package shown in FIG. 14 in substantially the same manner as for the foldable lens holder 360 shown in FIG. 14, 15A and 15B.

Figure 17:
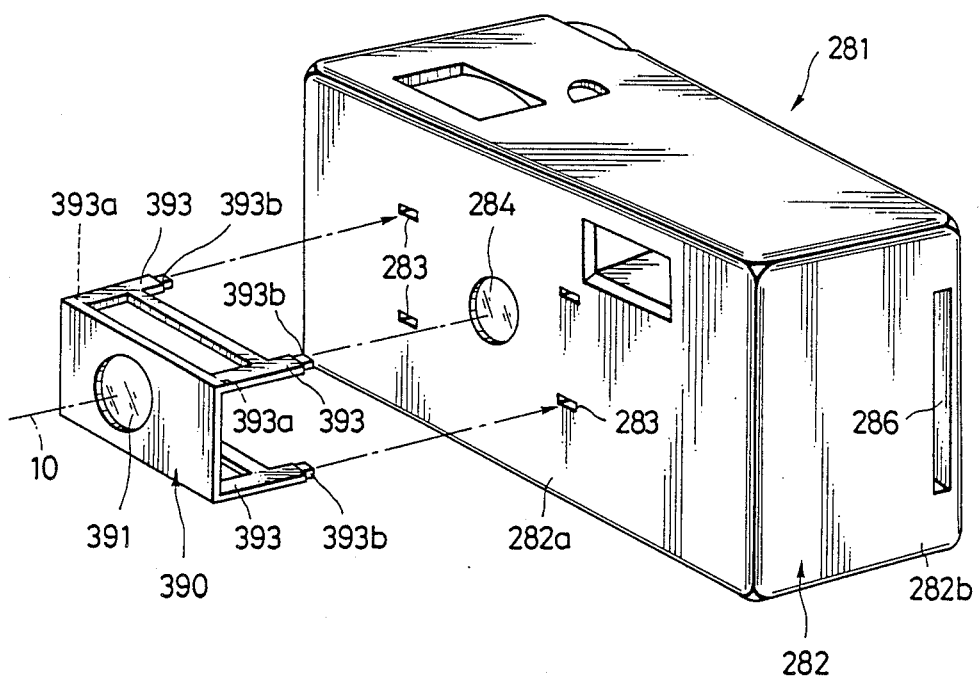
FIG. 17 is a perspective view of a lens-fitted film package in accordance with a further preferred embodiment of the present invention provided with a foldable lens holder having a single-element telephotographic conversion lens fitted thereto.

FIG. 17 shows a variant in which a foldable lens holder 390 holds a single-element conversion lens 291. The lens holder 390, which is made of plastic material as an integral unit, is provided with four side struts 393 foldable and unfoldable along grooved folding lines 393a. Each strut 393 has a projection 393b which is engageable with a small hole 283 formed in a front wall 282a of a generally rectangular box-shaped light-tight case 282 of a lens-fitted film package 281.

For telephotography, the lens holder 390 erected as shown in FIG. 17 is attached to the case 282 by fitting the projections 393b of the side struts 393 into holes 283 so as to position the conversion lens 391 in front of a taking lens 284, thereby forming a lens system suitable for telephotography.

The lens holder 390 is easily detached from the case 282 at any time for making the lens-fitted film package 281 ready for standard photography. The lens holder 390 can be folded up compactly and received in a pocket 286 formed in a side wall 282b of the case for convenience of carrying.

Figure 18A:
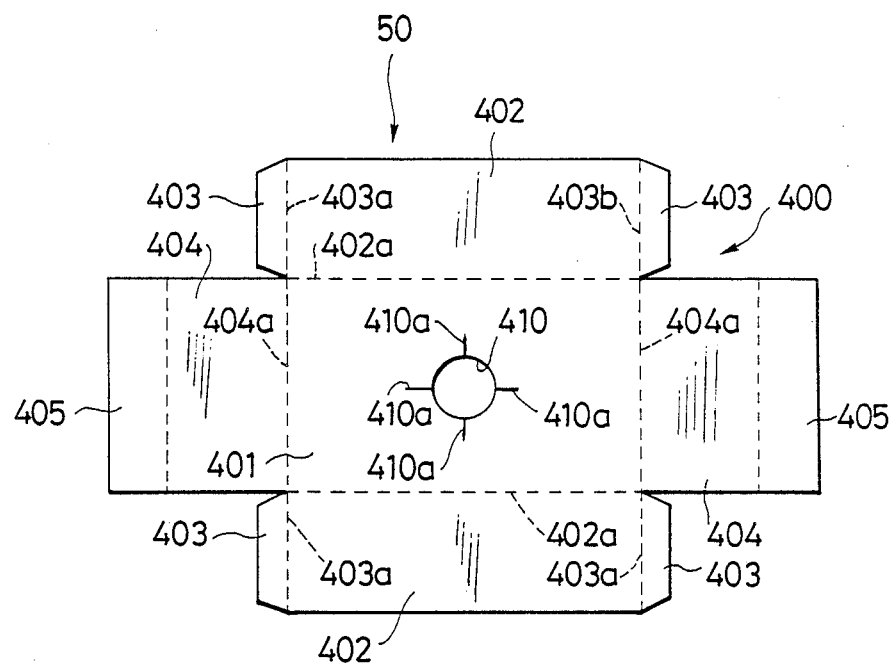
FIG. 18A is a uniplanar developed view of a variant of the foldable lens holder shown in FIG. 17, made of sheet paper.
Figure 18B:
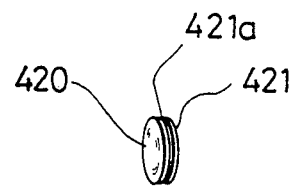
FIG. 18B is a perspective view of the lens of the single-element telephotographic conversion lens shown in FIG. 18B.

For economy, a lens holder for holding a single-element conversion lens may be made of sheet paper. As shown in FIGS. 18A and 18B, a sheet paper lens holder 400 is formed as an open-ended rectangular box. The top wall 401 of the box-shaped lens holder 400 is formed with a lens mounting opening 410. Around the opening, four slits 410a are formed. The lens holder 400 is formed with side walls 402 foldable along folding lines 402a and end walls 404 foldable along folding lines 404a. Each side wall 402 has end flaps 403 foldable along folding lines 403a. EAch end wall 404 has end flaps 405 foldable along folding lines 405a. Each flaps 403, 405 is attached with a double-sided adhesive tape.

To convert a lens-fitted film package for telephotography, the lens holder 400 is erected by folding the side and end walls 402 and 404. The end flaps 403 are adhered to inside surfaces of the end walls 404 with adhesive tape that was previously attached thereto. Thereafter, the end flaps 405 of the end walls 404 are folded and adhered to a front wall of a case of the lens-fitted film package with adhesive tape that was previously attached thereto.

Before or after attaching the erected lens holder 400 to the lens-fitted film package, a single-element plastic conversion lens 420 is fitted into the lens mounting opening 410. For easy fitting, the conversion lens is integrally formed with annular ring 421 with a thin V-shaped groove 421a around the outer periphery. When fitting the conversion lens 420 into the lens mounting opening 410, the top wall 401 around the opening 410 is slightly elastically deformed rearwardly because of the slits 410a. The bent portion of the top wall 401 springs back and the inner edge of the mounting opening 410 enters and engages with the V-shaped groove 421a of the annular ring 421 of the conversion lens 420, thereby firmly holding lens 420.

Although the present invention has been fully described by way of preferred embodiments thereof with reference to the accompanying drawings, it is to be noted that various changes and modifications will be apparent to those skilled in the art. Therefore, unless otherwise these changes and modifications depart from the scope of the present invention, they should be construed as included therein.

What is claimed is:

1. A lens-fitted film package comprising:
a light-tight case having at least a taking lens attached to a front wall and a roll of film contained therein; and
a lens holder comprising a lens board holding a conversion lens and positioning strut means fit-table onto said light-tight case for positioning said lens board at such a distance from said front wall of said light-tight case that said conversion lens is positioned so as to change the effective focal length of said taking lens, said positioning strut means being formed integrally with and foldable relative to said lens board.

2. A lens-fitted film package as defined in claim 1, wherein said light-tight case is formed with a pocket for receiving said lens holder when said foldable struts are folded up.

3. A lens-fitted film package as defined in claim 1, wherein said lens holder is formed with an opening for fitting said conversion lens thereinto.

4. A lens-fitted film package as defined in claim 3, wherein said lens holder is made of paper.

5. A lens-fitted film package as defined in claim 1, wherein said lens holder is integrally formed with said conversion lens.

6. A lens-fitted film package as defined in claim 5, wherein said lens holder is made of plastic material.

7. A lens-fitted film package comprising:
a light-tight case having at least a taking lens attached to a front wall thereof and a roll of film contained therein;
a generally rectangular box-shaped cover case formed with an opening for exposing said taking leans and an opening for defining a field of view of said viewfinder, said generally rectangular box-shaped cover case being slidably fitted onto said light-tight case for movement parallel to the optical axis of the taking lens between forward and rearward positions;

a conversion lens for changing the effective focal length of said taking lens;

conversion lens positioning means moved by said generally rectangular box-shaped cover case so as to move said conversion lens into and out of the optical path of said taking lens; and positioning means disposed between said light-tight case and said generally rectangular box-shaped cover case for positioning said generally rectangular box-shaped cover case in said forward position so as to cause said conversion lens positioning means to move said conversion lens into said optical path, thereby changing both the effective focal length of said taking leans and the field of view of said viewfinder suitably for said effective focal length of said taking leans thus changed.

8. A lens-fitted film package comprising:

a light-tight case having at least a taking lens attached to a front wall thereof and a roll of film contained therein;

a lens holder attached to said light-tight case and formed with an opening holding a conversion lens thereon, said lens holder comprising a generally rectangular box-shaped case slidably mounted on said light-tight case for movement parallel to the optical axis of said taking lens between a forward position wherein said conversion lens is positioned at a distance from and in alignment with said taking leans and a rearward position wherein said lens holder is closer to said front wall than in said forward position; and positioning means disposed between said light-tight case and said lens holder for positively selectively releasably positioning said lens holder in each of said forward and rear positions.

9. A lens-fitted film package as defined in claim 8, wherein said positioning means comprises a projection formed on one of said light-tight case and lens holder, and engaging means comprising a recess releasably engageable over said projection and formed on the other of said light-tight case and lens holder.

10. A lens-fitted film package as defined in claim 9, wherein said engaging means is a groove.

11. A lens-fitted film package as defined in claim 9, wherein said engaging means is an opening.

12. A lens-fitted film package comprising:

a light-tight case having at least a taking lens attached to a front wall thereof and a roll of film contained therein;

a lens holder attached to said light-tight case and formed with an opening detachably holding a conversion lens thereon;

said light-tight case having a recess for holding said conversion lens when said conversion lens is detached from said lens holder; and positioning means disposed between said light-tight case and said lens holder for positioning said conversion lens when held in said opening of said lens holder at a distance from and in alignment with said taking lens, thereby changing the effective focal length of said taking lens.

13. A lens-fitted film package comprising:

a light-tight case having at least a taking lens attached to a front wall thereof and a roll of film contained therein;

a lens holder attached to said light-tight case and formed with an opening holding a conversion lens thereon, said lens holder being of generally rectangular box-shaped configuration slidably mounted on said light-tight case for movement parallel to the optical axis of said taking lens; and positioning means disposed between said light-tight case and said lens holder for positioning said conversion lens at a distance from and in alignment with said taking lens, thereby changing the effective focal length of said taking lens;

said lens holder being slidable onto said light-tight case from either the front or the rear of said light-tight case and said positioning means positioning said lens holder at a position wherein it snugly encloses said light-tight case on all sides other than the front when said lens holder is slid onto said light-tight case from the rear.

14. A lens-fitted film package comprising:

a light-tight case having at least a taking lens attached to a front wall thereof and a roll of film contained therein;

a lens holder attached to said light-tight case and formed with an opening holding a conversion lens thereon; and positioning means disposed between said light-tight case and said lens holder for positioning a said conversion lens mounted in said opening of said lens holder at a distance from an in alignment with said taking lens, thereby changing the effective focal length of said taking lens, said positioning means comprising a connecting shoe formed on said lens holder and a shoe clip groove in the form of a bayonet slot formed in said light-tight case.

15. A lens-fitted film package as defined in claim 14, wherein said bayonet slot is formed in one side wall of said light-tight case and extends parallel to the axis of said taking lens.

16. A lens-fitted film package as defined in claim 14, wherein said bayonet slot is formed in said front wall of said light-tight case and extends vertically.

17. A lens-fitted film package comprising:

a light-tight case having at least a taking lens attached to a front wall thereof, a veiwfinder and a roll of film contained therein;

a lens holder slidably fitted onto said light-tight case, said lens holder being formed with a lens fitting opening removably holding a conversion lens therein and a viewfinder opening; and positioning means fixing two predetermined positions of said lens holder in one of which said lens holder is at such a distance from said front wall that said conversion lens fitted onto said lens holder changes the effective focal length of said taking lens and said viewfinder opening defines a field of view of said viewfinder suitable for said effectively changed focal length of said taking lens, and in the other of which two positions said lens holder is disposed closer to said front wall than in said one position and said lens fitting opening with said conversion lens removed exposes said taking lens.

* * * * *